INVENTORS
WILMER E. FUNK
IRA H. SAGE

United States Patent Office 3,719,983
Patented Mar. 13, 1973

---

3,719,983
INTERNAL FLASH REMOVAL METHOD
Wilmer E. Funk, Roanoke, and Ira H. Sage, Peoria, Ill., assignors to Production Technology Inc., Peoria, Ill.
Original application Sept. 23, 1968, Ser. No. 761,763. Divided and this application Jan. 22, 1970, Ser. No. 10,678
Int. Cl. B23k 27/00
U.S. Cl. 29—470.3    2 Claims

ABSTRACT OF THE DISCLOSURE

An internal flash removal broach tool is provided for use with a friction welding machine to remove the internal flash produced at the weld interface of an assembly comprised of two tubular members. The tool is provided with a plurality of cutting edges which produce segmental rather than circular cuttings and the blades progressively increase in diameter to assure removal of substantially all of the flash material.

---

This is a division of application Ser. No. 761,763, filed Sept. 23, 1968 now abandoned.

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature, whereupon the relative rotation subsides and a bond is formed between the workpieces.

It is also to be understood that the invention is applicable to the inertia friction welding process as described in U.S. Pat. No. 3,273,233 and as set forth below.

In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to the engagement of the parts at the interface. The stored energy is discharged into the interface through frictional heating and plastic working developed at the interface as the rubbing contact slows the rotating weights and the bonding cycle is concluded.

The invention is particularly directed to an internal flash removal broach tool and more specifically to a tool which is capable of removing substantially all of the internal flash from a friction welded joint of tubular members without providing a separate machining operation and without removing the welded assembly from the welding machine.

In accordance with the invention a one-piece internal broach tool may be attached to and inside the rotating spindle of a friction welding machine. The broach tool is provided with a plurality of cutting edges wherein each succeeding cutting edge is slightly larger and/or of different geometrical configuration than the previous cutting edge. Due to the size and shape of the cutting edges as the tool is moved across the weld flash a larger and larger amount of material is removed by the cutting edges until the last cutting edge removes the final portion that will be cut from the weld flash.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
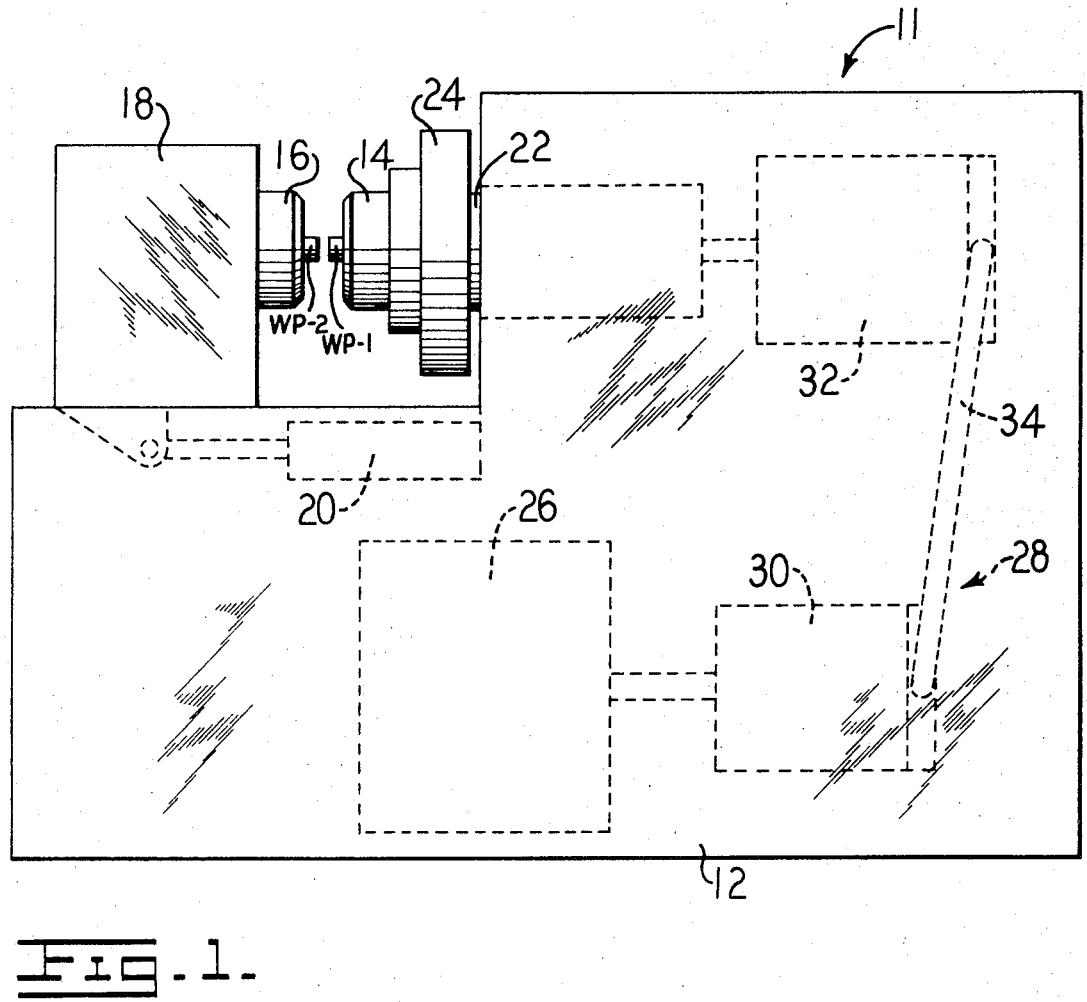
FIG. 1 is a side elevation illustrating one embodiment of a friction welding machine which may be used to practice the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP-1 and WP-2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP-1 and WP-2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Pat. No. 3,273,233 and as described in further detail below.

A welding operation to join a first tubular workpiece to a second tubular workpiece can be performed by operating the machine in the following general manner. One of the tubular weld pieces WP-1 is firmly clamped in the rotatable chuck 14 located on the spindle 22. The other tubular weld piece WP-2 is firmly clamped in the non-rotatable chuck 16 which is located on the tailstock portion 18 of the machine. Upon actuation of the motor 26, the flywheel and workpiece WP-1 are accelerated to a predetermined velocity.

Once the predetermined velocity has been obtained, the motor 26 is disconnected or shutdown and the ram mechanism 20 is actuated to move tailstock portion 18 and workpiece WP-2 into contact with the rapidly rotating workpiece WP-1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed.

Figure 2A:
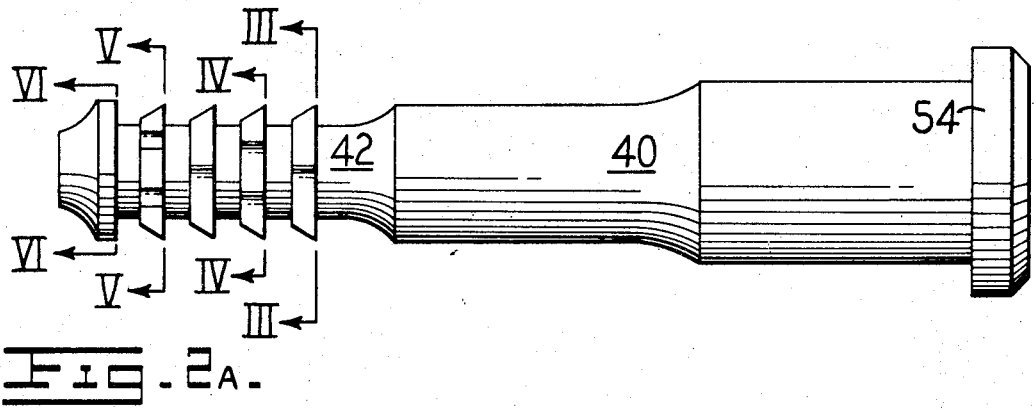
FIG. 2A is a longitudinal view illustrating certain details of the broach tool of the present invention.
Figure 2:
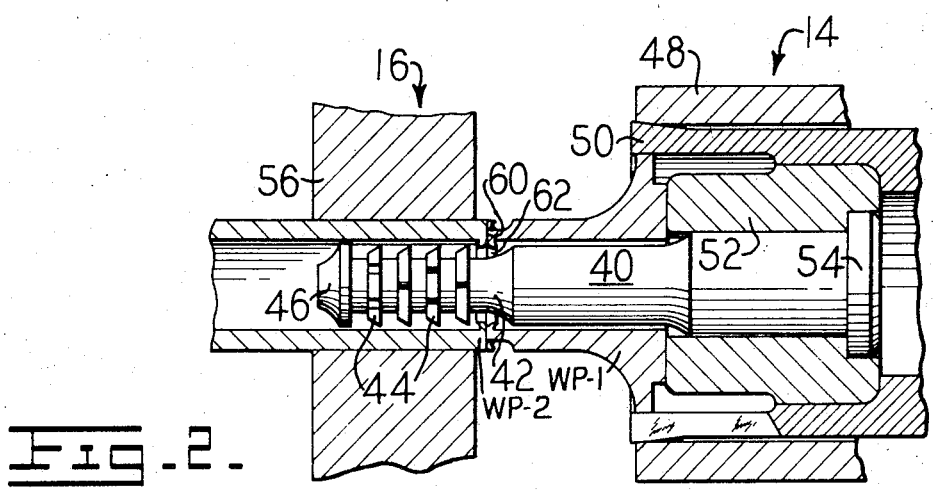
FIG. 2 is a longitudinal view partially in section illustrating one embodiment of the broach tool of the present invention at the beginning of an internal flash removal operation.

Referring now to FIG. 2 there is shown one embodiment of an internal flash removal broach tool generally indicated at 40. The leading end of the broach tool 40 is provided with a reduced diameter portion 42, a plurality of cutting edges 44 and a nose portion 46.

As shown in FIG. 2 the broach tool 40 is positioned inside collet chuck 14 which is fastened to the rotary spindle 22 of the welding machine as shown in FIG. 1. The collet chuck 14 comprises a housing 48, a collet sleeve 50 and a backstop member 52. The rear portion of the broach tool 40 is fastened to the backstop member 52 by means of the enlarged annular shoulder 54 formed on the rearmost portion of the tool 40. In the embodiment shown in FIG. 2 the broach tool 40 will rotate with the collet chuck 14 when the rotary spindle 22 of the welding machine is rotated. It is to be recognized that a similar holding arrangement for the broach tool could be provided with respect to the non-rotating chuck 16 if desired.

As further illustrated in FIG. 2 the rotatable tubular workpiece WP-1 is firmly gripped and held against slipping by the collet sleeve 50 of the collet chuck assembly 14. It should be further observed that the front end of the backstop member 52 supports the rearward portion of the tubular workpiece WP-1 against axial movement due to pressure which is applied during the welding operation.

The non-rotatable workpiece WP-2 is firmly held in chuck jaws 56 of the non-rotatable fixture or chuck 16 which is, in turn, connected to the tailstock assembly 18.

In a typical operation the broach tool 40 is fastened to the back of block 52 and inside the collet chuck assembly 14. The workpiece WP-1 is then slipped over the cutting edges of the broach tool 40 and inside the collet sleeves 50 and butted against the front of member 52. A drawbar (not shown) then actuates the collet chuck, drawing the collet sleeve 50 into the tapered housing 48 thereby clamping onto the tubular workpiece WP-1. The other workpiece WP-2 is then inserted into the tailstock portion of the machine and the jaws 56 are firmly clamped against workpiece WP-2 to hold it against rotation.

When the rotatable workpiece WP-1 and non-rotatable workpiece WP-2 have been firmly clamped in the welding machine a hydraulic ram (not shown) is actuated and the spindle and collet chuck assembly 14 move forward. This causes the nose 46 and the cutting blades 44 of the broach tool 40 to move inside the workpiece WP-2. When the spindle and collet chuck assembly 14 have moved far enough forward so that the two workpieces WP-1 and WP-2 are in close proximity actuation of the hydraulic ram is stopped. This will leave weld area 60 of the two weld pieces WP-1 and WP-2 approximately in the middle of the reduced diameter portion 42 of the broach tool 40.

Power is then supplied to cause the spindle and collet chuck assembly 14 to rotate. After a predetermined velocity has been reached, power to the spindle is discontinued, and at the same time the hydraulic ram is actuated causing the spindle and collet chuck assembly 14 to move forward and the workpieces WP-1 and WP-2 come into contact at the weld area 60. The stored energy of the rotating flywheel and spindle is then converted to frictional heat at the common interface of the weld pieces.

A weld flash 62 (FIG. 2) is formed as the weld is completed and the spindle and all rotating members come to rest. The force on the spindle drawbar is then released causing the collet sleeve 50 to loosen and release the workpiece WP-1. The other side of the hydraulic ram associated with the collet spindle assembly 14 is then pressurized causing the assembly 14 to move backwards into the machine which would be to the right as viewed in FIG. 2. Since the broach tool 40 is securely fastened inside the collet chuck assembly 14 it also moves back into the machine in a rightward direction. The cutting edges or blades 44 of the tool are then pulled across the weld flash 62 and each blade cuts a successively deeper portion of metal away until substantially all of the flash is removed, see FIG. 7. After the nose 46 of the tool has moved completely out of the welded tubular assembly the jaws 56 of chuck 16 are released and the welded tubular assembly is removed from the machine.

As briefly described earlier, the working area of the broach tool is provided with a plurality of cutting edges or blades 44. Each of the cutting blades 44 has either a different geometrical configuration or diameter with respect to its neighboring laterally adjacent blade or blades. This feature of the invention can be observed by viewing FIG. 2A in conjunction with FIGS. 3, 4, 5 and 6.

It should be noted that the cutting blade nearest the reduced diameter portion 42 has the smallest diameter and that the diameters progressively increase with the blade nearest the nose portion 46 of the broach tool having the largest diameter. Thus the broach tool 40 is designed with each of the cutting blades 44 having a different configuration or slightly larger in diameter than the previous blade as the cutting edges progress from the reduced area 42 to the nose portion 46. In this manner, each of the cutting edges 44 cuts a slightly larger portion of the flash 62 away as the broach tool 40 is pulled across the weld flash (see FIG. 7).

Figure 7:
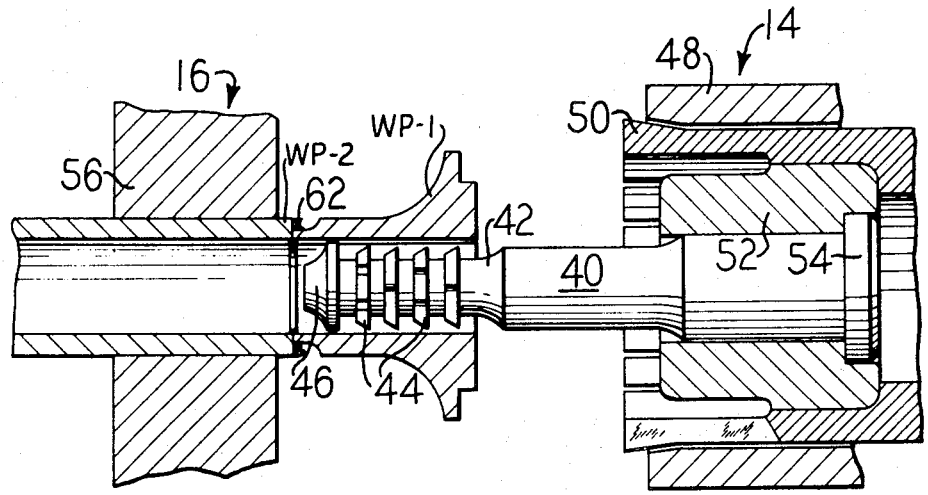
FIG. 7 is a longitudinal view similar to FIG. 2 illustrating the broach tool of the present invention at the conclusion of an internal flash removal operation; and, FIG. 8 is a longitudinal view partially in section illustrating a modified embodiment of the broach tool of the present invention.

As shown in FIG. 7 when the last cutting edge (the one nearest the nose 46 of the tool) has passed across the weld flash 62 substantially all of the flash material has been cut away. Since the largest cutting edge is slightly smaller (approximately $\frac{1}{32}''$) in diameter than the inside diameter of the workpiece WP-2, a very slight amount of flash is left on the welded tubular assembly. The amount of flash that is left is approximately $\frac{1}{64}''$ on the radius. Since this remaining flash is very small and smooth it will not present any problems under normal circumstances and no further finishing operations are needed.

Figure 3:
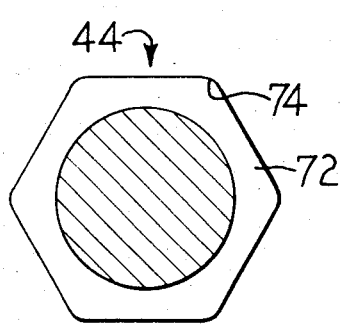
FIG. 3 is a cross-sectional view taken on the line III—III of FIG. 2A.

Referring back to FIGS. 3, 4, 5 and 6 there are shown certain geometrical configurations for the cutting edges 44. As shown in FIG. 3 the cutting edge 72 is in the form of a hexagon. This hexagon is sized with respect to the internal flash 62 so that the only part of the cutting edge 72 which actually cuts into the flash material 62 is that portion depicted on the corners of the hexagonal cutting edge 72 and denoted by the reference character 74.

The cutting edge 72 is formed in this manner so that only incremental or segmental cutting of flash material is preformed as the blade is drawn across the flash 62. Due to this geometrical configuration the flash cuttings or chips are never in the form of a complete circular chip but instead are segmental and easily fall away from the tool 40. This is an important feature since a completely circular chip would remain on the cutting tool and would be difficult to remove after the broaching operation.

Figure 4:
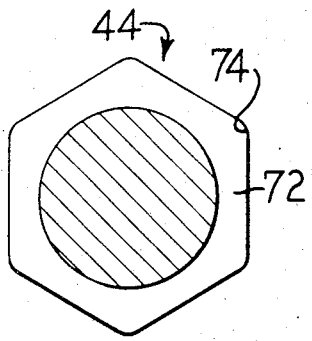
FIG. 4 is a cross-sectional view taken on the line IV—IV of FIG. 2A.

FIG. 4 illustrates a cutting edge 72 which is identical with that shown in FIG. 3 with the exception that the actual cutting portion 74 is rotated so as to be out of phase with the cutting edge 74 shown in FIG. 3. If the cutting edges shown in FIGS. 3 and 4 are placed laterally adjacent one another it will be observed that a different cut or incremental chip will be removed from the flash 62 as the tool 40 is withdrawn from the workpieces as shown in FIG. 7. In addition, a series of such cutting blades could be provided with progressively increasing diameters so that eventually substantially all of the flash material 62 would be removed.

Figure 5:
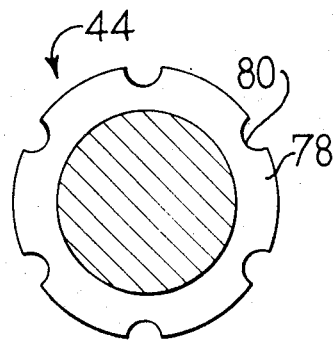
FIG. 5 is a cross-sectional view taken on the line V—V of FIG. 2A.

FIG. 5 illustrates yet another cutting edge configuration wherein the cutting edge 78 is circular and a plurality of non-cutting notches or slots 80 are provided so that non-circular chip segments will be cut away from the flash material 62 as the tool 40 is withdrawn. Thus the cutting edge configuration of FIG. 5 produces incremental chip cuttings much the same as that shown in FIGS. 3 and 4 except that the actual cutting edge 78 is somewhat larger than the cutting edges 74, and therefore a slightly larger chip would be cut away.

Figure 6:
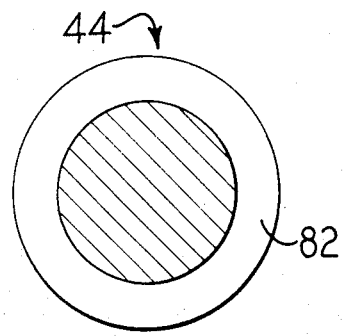
FIG. 6 is a cross-sectional view taken on the line VI—VI of FIG. 2A.

FIG. 6 illustrates a completely circular cutting edge 82 which is the final cutting edge or edges near the nose portion 46 of the tool. The circular cutting blade 82 of FIG. 6 takes a very fine final clean-up cut and in essence only removes flash material which would have remained due to the notches, such as shown at 80 in FIG. 5, formed in previous cutter blades.

The principal feature of the cutting blades 44 resides in that all except possibly the last circular blade near the nose portion of the tool produce segmental rather than circular chips and the blades progressively increase in diameter between the reduced portion 42 and the nose portion 46 of the tool. A preferred embodiment of the invention utilizes a series of at least six hexagonal cutting edges 72 (FIGS. 3 and 4) on that portion of the tool which is located nearest the reduced diameter portion 42. The second series of cutting edges in the preferred embodiment of the invention is comprised of at least two of the notched cutting edges 78 as shown in FIG. 5. The last two cutting edges in the preferred embodiment are circular blades as shown at 82 in FIG. 6.

Figure 8:
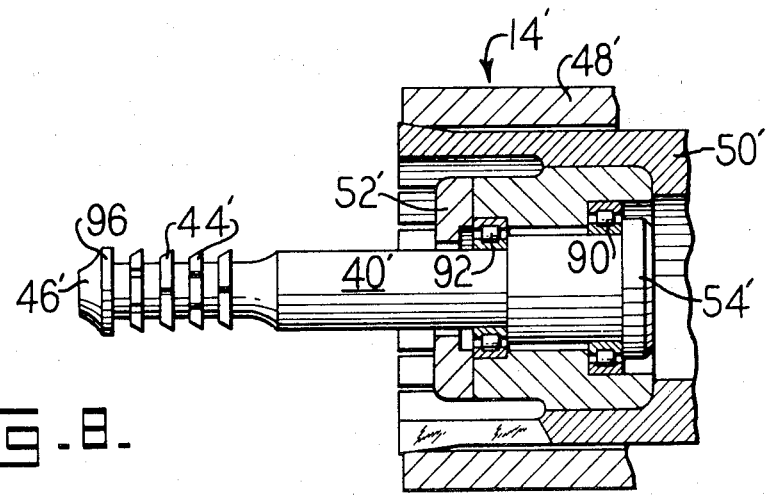

FIG. 8 illustrates a modified embodiment of the invention wherein the largest cutting edge is almost the exact size of the inner diameter of the tubular workpiece WP-2. This embodiment of the invention utilizes radial rotating bearings 90 and 92 which permit relative rotation between the collet chuck assembly 14' and the tool 40'.

Unlike the embodiment shown in FIG. 2 the broach tool 40' mounted in the bearing elements 90 and 92 can remain stationary inside the workpiece WP-2 during the welding operation. Since the largest cutting edge 96 of the tool 40' is nearly the exact size of the inner diameter of the workpiece WP-2, the final cut made by this cutting edge would be very nearly the same size as the inner diameter of WP-2 and substantially the entire flash material 62 could be removed.

The embodiment shown in FIG. 8 can be used in those instances where it is important to remove substantially all of the flash material from the friction welded tubular assembly. This would be very difficult with the embodiment shown in FIG. 2 since the tool 40 rotates during the welding operation and as the last cutting edge approaches the size of the inner diameter of the workpiece WP-2 perfect alignment would be required to prevent scoring or cutting of the inner surfaces of the workpiece WP-2.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of removing an internal, generally annular shaped flash formed at the interface of a friction welded assembly, which assembly is comprised of first and second tubular workpieces bonded across their common interface, said method comprising:

placing each of said tubular workpieces in a separate workholder, providing a first one of said separate workholders with a flash removal broach tool which is provided with a cutting portion, which protrudes axially outwardly through the end of said first tubular workpieces;

moving said tubular workpieces into close proximity with each other so that said cutting portion of the tool extends inside said second tubular workpiece;

relatively rotating said workpieces;

forcing said workpieces into frictional engagement at their common interface until a bond is formed and said relative rotation stops;

said bond characterized by an internal, generally annular flash protruding radially inwardly from said interface toward said tool;

releasing said first tubular workpiece from said first workholder; and relatively moving said workholders in a direction to withdraw said broach tool from said welded assembly so that said cutting portion of the tool removes substantially all of said internal flash material from the welded assembly at said interface.

2. A method as set forth in claim 1 and further comprising the step of relatively rotating said first workholder with respect to said broach tool while the tool is positioned inside said second tubular workpiece.

References Cited

UNITED STATES PATENTS

| 2,787,047 | 4/1957 | Schupñer | 29—95.1 |
| 3,438,561 | 4/1969 | Calton | 228—2 |

ROBERT D. BALDWIN, Primary Examiner

R. J. CRAIG, Assistant Examiner

U.S. Cl. X.R.

29—95.1; 90—24; 228—2